United States Patent
Callahan et al.

(10) Patent No.: US 7,663,419 B1
(45) Date of Patent: Feb. 16, 2010

(54) CLOCK SYSTEMS AND METHODS

(75) Inventors: Kent R. Callahan, Hillsboro, OR (US); Robert M. Bartel, Hillsboro, OR (US)

(73) Assignee: Lattice Semiconductor Corporation, Hillsboro, OR (US)

(*) Notice: Subject to any disclaimer, the term of this patent is extended or adjusted under 35 U.S.C. 154(b) by 0 days.

(21) Appl. No.: 12/273,868

(22) Filed: Nov. 19, 2008

Related U.S. Application Data

(63) Continuation of application No. 11/530,620, filed on Sep. 11, 2006, now Pat. No. 7,456,672.

(51) Int. Cl.
*G06F 1/04* (2006.01)
(52) U.S. Cl. .................. 327/291; 327/295
(58) Field of Classification Search ............... 327/295, 327/291, 261
See application file for complete search history.

(56) References Cited

U.S. PATENT DOCUMENTS

| | | | |
|---|---|---|---|
| 6,794,912 B2 * | 9/2004 | Hirata et al. | 327/158 |
| 7,456,672 B1 * | 11/2008 | Callahan et al. | 327/291 |
| 7,511,547 B2 * | 3/2009 | Suda et al. | 327/276 |
| 2005/0179479 A1 * | 8/2005 | Nguyen et al. | 327/295 |
| 2006/0017512 A1 * | 1/2006 | Huang | 331/17 |

* cited by examiner

*Primary Examiner*—Lincoln Donovan
*Assistant Examiner*—Ryan C Jager

(57) ABSTRACT

Systems and methods are disclosed herein to provide improved clock, delay, and skew techniques. For example, in accordance with an embodiment of the present invention, an integrated circuit includes a clock generator to provide a bias signal and a clock signal, with control logic providing a delay control signal based on the bias signal and a multi-bit control signal. A clock skew circuit provides a delay to the clock signal based on the delay control signal provided by the control signal. Memory coupled to the control logic provides the multi-bit control signal.

14 Claims, 6 Drawing Sheets

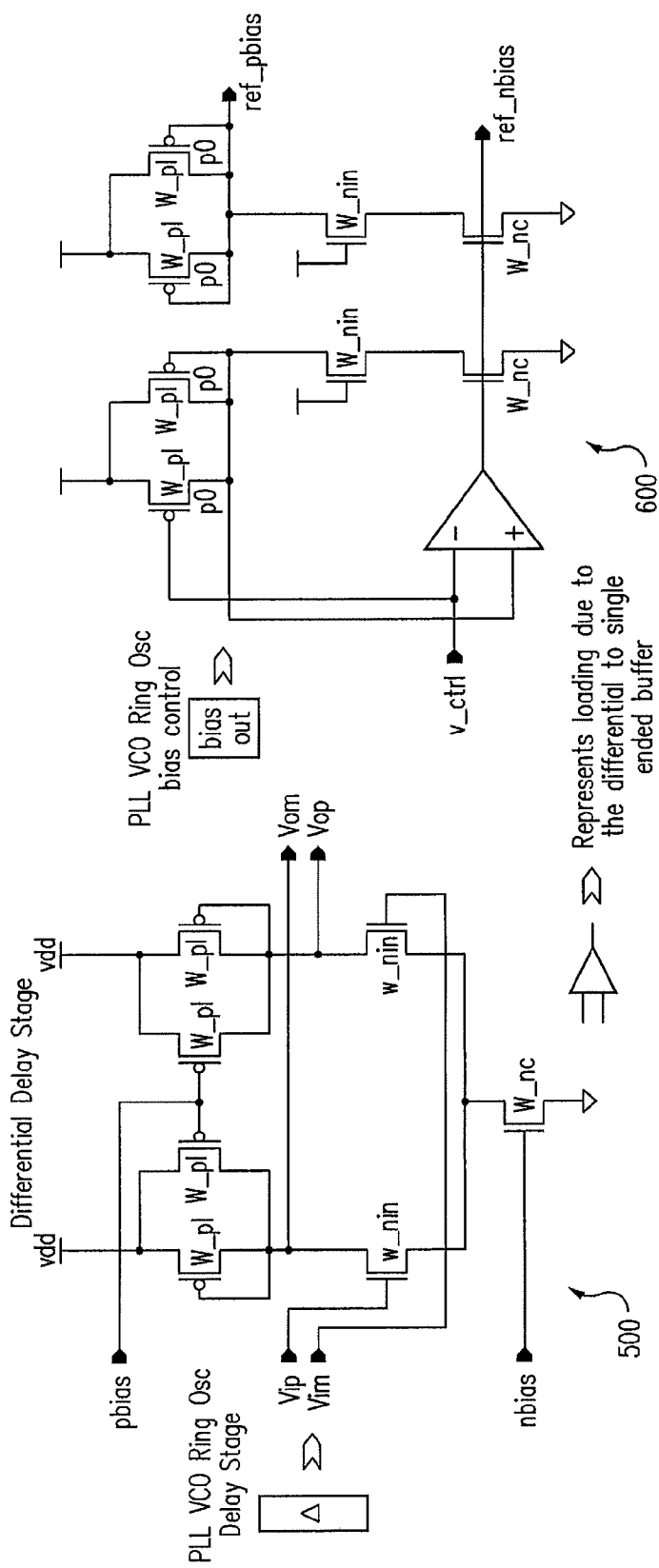
FIG. 5
FIG. 6
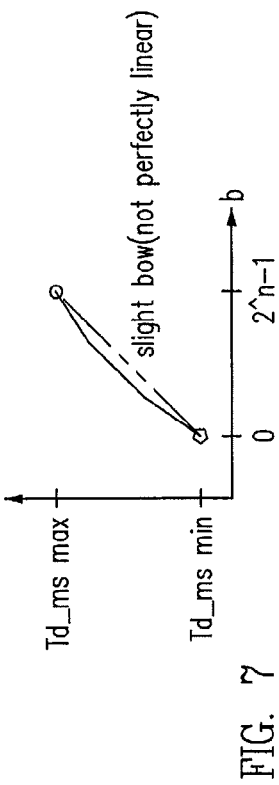
FIG. 7

CLOCK SYSTEMS AND METHODS

RELATED APPLICATION DATA

This application is a continuation of U.S. application Ser. No. 11/530,620, filed Sep. 11, 2006, which is hereby incorporated by reference in its entirety.

TECHNICAL FIELD

The present invention relates generally to electrical circuits and, more particularly, to clock systems and methods for electrical devices.

BACKGROUND

System clocks for electrical devices (e.g., printed circuit boards) may be constrained by a number of error sources. For example, these error sources may include path length discrepancies and mismatch (e.g., for printed circuit board traces), static phase offset of phase-locked loop (PLL)/delay-locked loop (DLL) clocks and zero delay buffers, channel-to-channel skew, and various forms of jitter.

Various approaches to eliminate mismatch between clock channels (e.g., for digital clock systems) include using known layout techniques and providing gate delays and trimming. However, these approaches generally offer only a very coarse approximation and typically do not reduce overall mismatch, especially over process, voltage and temperature. The gate delay approach also has a lower limit of a single delay stage and, although it is possible to modify a stage delay with additional loading for example, this generally does not result in a very linear and controlled process.

Conventional clock generator devices (e.g., clock generator or buffer chips) may use a skew control method based on voltage-controlled oscillator (VCO) stage clocks to generate a coarse skew control to reduce large variations in skew. However, this approach cannot perform very fine variations in skew control as fine variations in skew control generally would require more stages in the VCO, which may slow down the VCO and may also create additional jitter. There is also a lower limit to the fine variation with this approach, based on the VCO stage delay, and the circuitry may be large and complex if many stages are used as the necessary logic increases at a $2^N$ rate (where N is the number of VCO stages). As a result, there is a need for improved clock techniques for providing clock signals.

SUMMARY

In accordance with one embodiment of the invention, a clock skew control circuit for an integrated circuit comprises a course skew circuit adapted to receive a clock signal from a clock generator and provide the clock signal with a first delay; a first multiplexer adapted to select the clock signal from the clock generator or the delayed clock signal from the coarse skew circuit to provide as the clock signal; a fine skew circuit adapted to receive the clock signal from the first multiplexer and provide the clock signal with a second delay, wherein the delay provided by the fine skew circuit is based at least in part on a bias signal provided by the clock generator; a second multiplexer adapted to select between the clock signal from the first multiplexer and the delayed clock signal from the fine skew circuit, and memory coupled to the first and second multiplexers for providing control signals that control clock signal selection by the multiplexers.

In accordance with another embodiment of the invention, an integrated circuit comprises a clock generator adapted to provide a bias signal and a clock signal; a current-controlled digital to analog converter adapted to receive the bias signal and a digital control signal and provide a current-based delay control signal; a clock skew circuit adapted to provide a delay to the clock signal based on the bias signal and the current-based delay control signal provided by the digital-to-analog converter; and memory coupled to the current-controlled digital-to-analog converter for providing the digital control signal.

In accordance with another embodiment of the invention, an integrated circuit comprises a clock generator adapted to provide a bias signal and a clock signal; control logic adapted to receive the bias signal and a multi-bit control signal and provide a delay control signal based on the bias signal and multi-bit control signal; a clock skew circuit adapted to provide a delay to the clock signal based on the delay control signal provided by the control logic; and memory coupled to the control logic for providing the multi-bit control signal.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 5 shows a block diagram illustrating an exemplary circuit implementation for a portion of the circuit of FIG. 3 in accordance with an embodiment of the present invention.

FIG. 6 shows a block diagram illustrating an exemplary circuit implementation for a portion of the circuit of FIG. 3 in accordance with an embodiment of the present invention.

FIG. 7 shows a graph illustrating simulated performance of the circuit of FIG. 3 in accordance with an embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
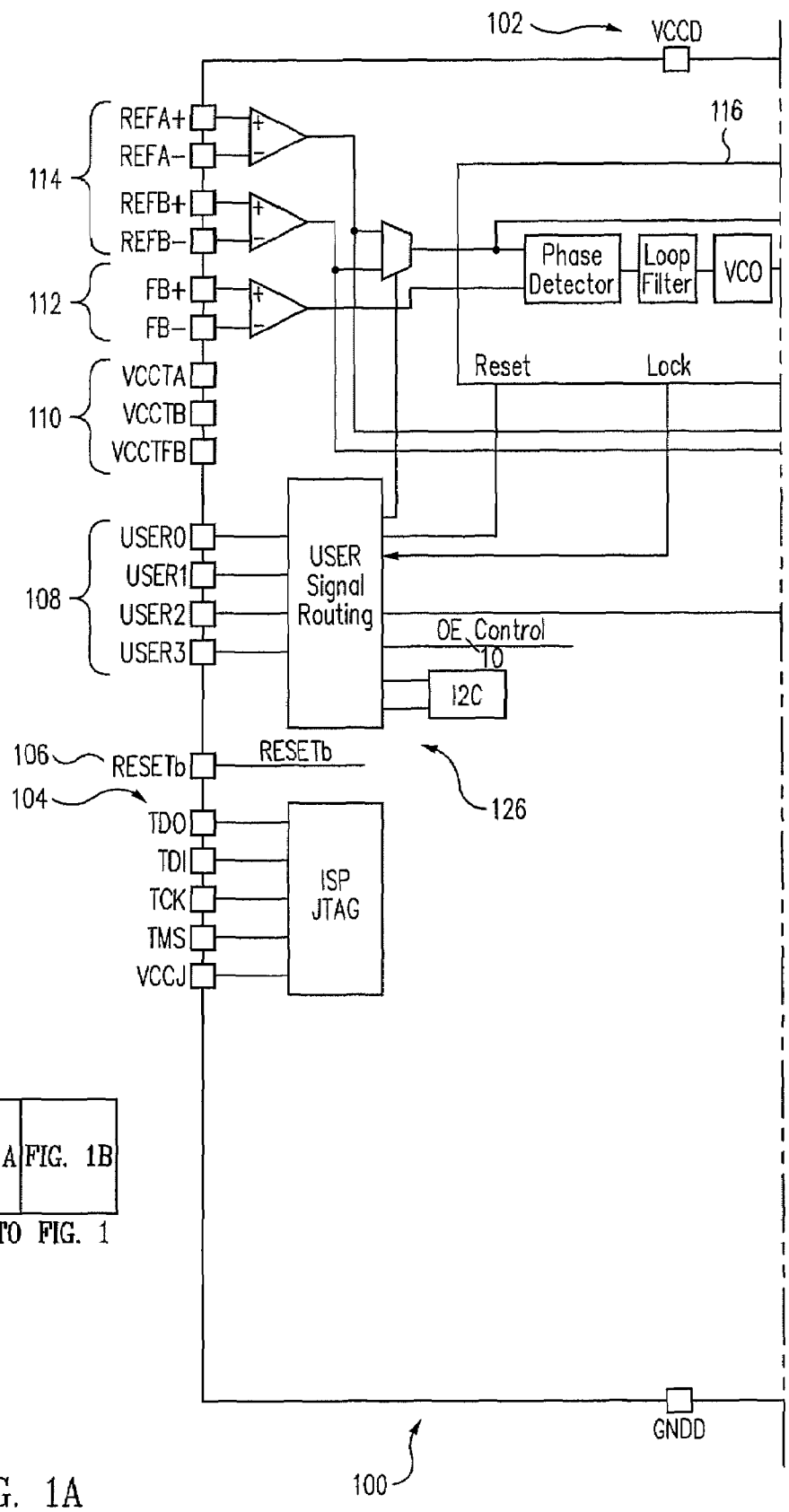
FIG. 1 shows a block diagram illustrating an integrated circuit for providing one or more clock signals in accordance with an embodiment of the present invention.
Figure 1B:
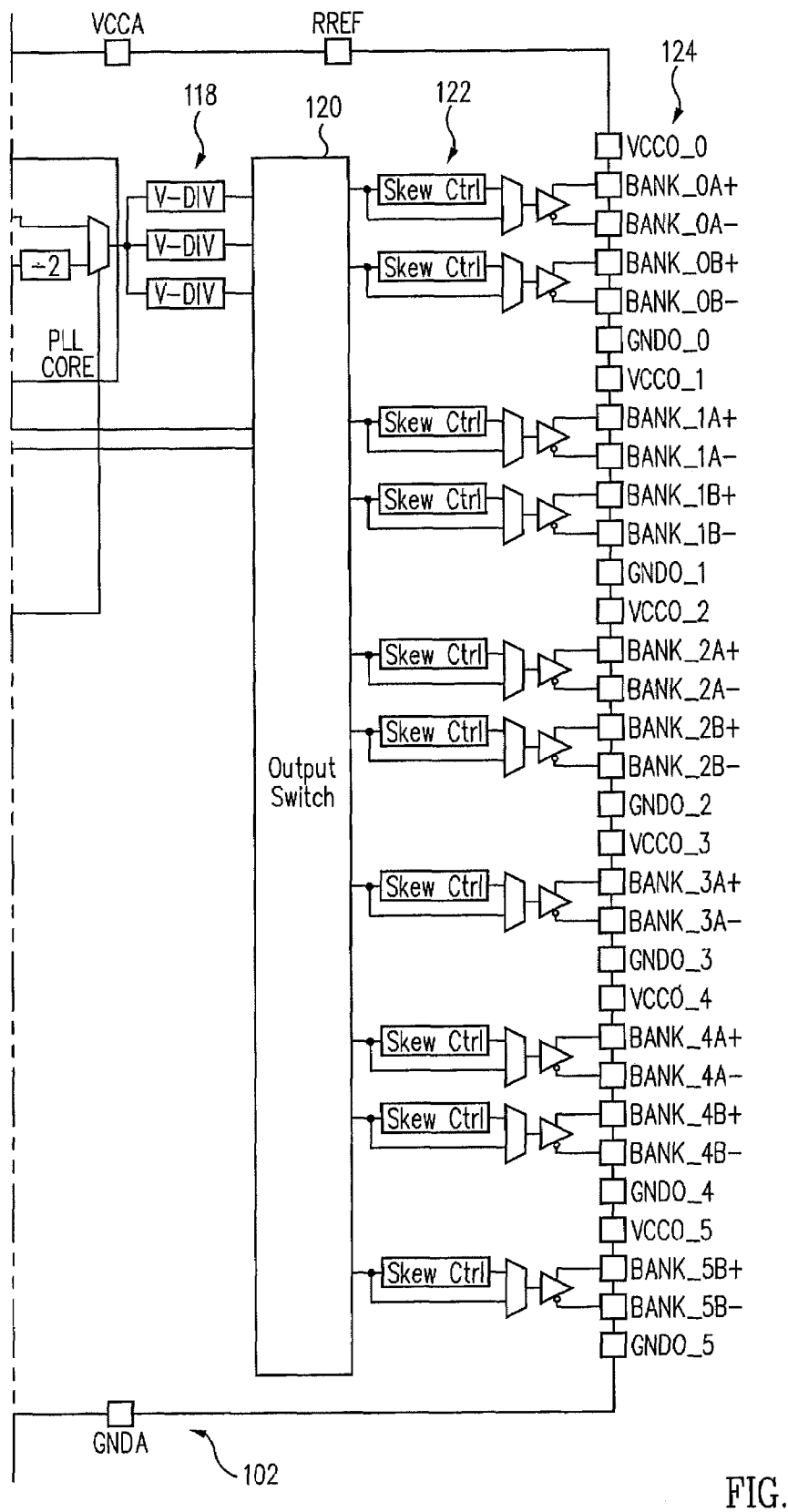

FIG. 1 shows a block diagram illustrating an integrated circuit 100 for providing one or more clocks in accordance with an embodiment of the present invention. Integrated circuit 100 may represent, for example, a clock generator circuit or a buffer chip and is shown in a general non-limiting fashion as an exemplary circuit to illustrate one or more embodiments of the present invention.

For example, integrated circuit 100 optionally may have one or more supply voltage terminals 102 (e.g., labeled VCCD, VCCA, RREF, GNDD, and GNDA to indicate various supply, reference, and/or ground terminals), JTAG terminals 104 (e.g., labeled TDO, TDI, TCK, TMS, and VCCJ), a reset terminal 106, one or more user terminals 108, supply voltage terminals 110, feedback signal terminals 112, reference signal terminals 114, a phase-locked loop (PLL) 116, one or more voltage dividers 118, an output switch 120, skew control circuits 122, output terminals 124, and user logic 126. In general, integrated circuit 100 is shown to illustrate a typical integrated circuit that may utilize skew control as set forth in one or more embodiments of the present invention.

PLL 116 may selectively receive a reference signal and a feedback signal (e.g., each from a differential signal pair) and provides a PLL output signal such as a clock signal to one or more output terminals 124 optionally via one or more voltage dividers 118 and output switch 120. Skew control circuits 122 are shown generally and provided between PLL 116 and output terminals 124 (e.g., also referred to herein as channels) to provide fine skew control in accordance with one or more embodiments of the present invention. User logic 126 may be provided to communicate with and control PLL 116 signal generation, as would be understood by one skilled in the art.

In general for example, skew control techniques are provided herein to reduce channel-to-channel skew and reduce system delay variations. As an example, reduction of these common error sources may improve timing margins on digital system clocks.

As noted above, conventional clock chips (e.g., in-system programmable clock chips) use a skew control method based on the VCO-stages to generate a coarse skew control. This approach reduces large variations in skew, but cannot perform very fine variations in skew control. Typically, fine variations in skew control require more stages in the VCO, potentially slowing down the PLL response and creating jitter. There is also a lower limit based on the VCO stage delay and may require large and complex circuitry if many stages are used (e.g., logic to implement increases at a $2^N$ rate, where N is the number of VCO stages).

In contrast in accordance with one or more embodiments of the present invention, fine skew control techniques are disclosed for providing fine and precise time delay shifts, which may be used for example to control digital clock signals for DLL and PLL-based clock generators, synthesizers, or buffers (e.g., PLL 116 may be replaced with a DLL to generate clock signals). The techniques disclosed do not require additional stages in the ring oscillator of the PLL and may use common PLL components (e.g., VCO charge pump, biasing, and/or similar delay elements as explained further herein).

Figure 2:
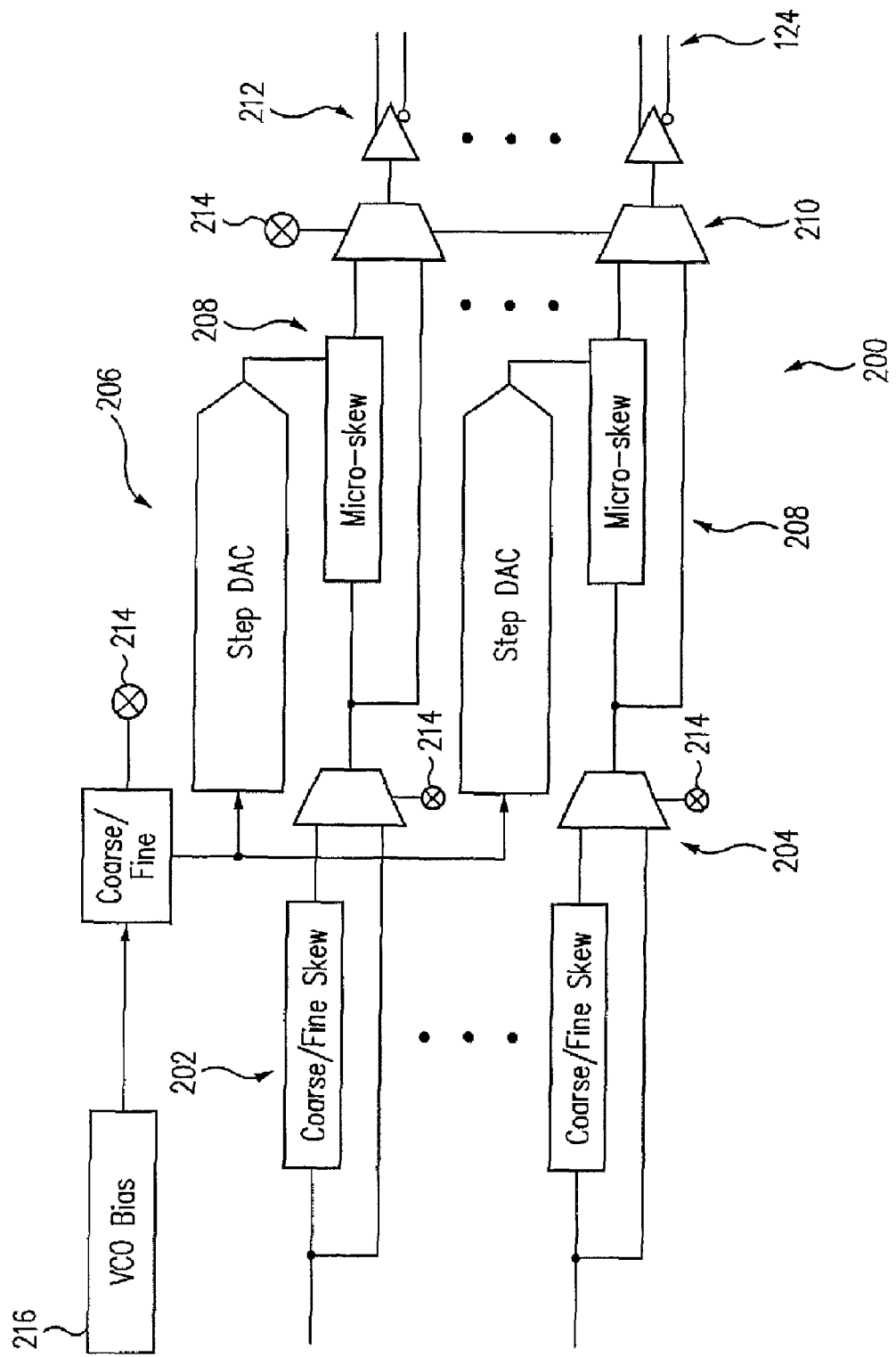
FIG. 2 shows a block diagram illustrating an exemplary circuit for a portion of the integrated circuit of FIG. 1 in accordance with an embodiment of the present invention.

For example, FIG. 2 shows a block diagram illustrating an exemplary circuit 200 for incorporation within integrated circuit 100 of FIG. 1 in accordance with an embodiment of the present invention. Specifically for example, circuit 200 may represent a more detailed exemplary implementation of skew control circuits 122.

Circuit 200 includes coarse/fine skew circuits 202, bypass multiplexers 204 and 210, control logic 206, micro-skew circuits 208, and drivers 212. Coarse/fine skew circuits 202 may represent conventional skew control techniques for providing coarse and fine skew, which can be selectively bypassed via optional bypass multiplexers 204.

Control logic 206 (labeled coarse/fine and step DAC) receives a VCO bias signal 216 from PLL 116 and provides control signals (e.g., delay control signals) to micro-skew circuits 208, which can be selectively bypassed via optional bypass multiplexers 210. In accordance with an embodiment of the present invention, VCO bias signal 216 represents a bias signal generated within PLL 116 to provide VCO bias control (e.g., as discussed further in reference to FIGS. 3 and 6).

Circuit 200 may be controlled by control signals, with the control signals optionally provided by memory 214 (e.g., volatile or non-volatile memory, such as static random access memory, fuses, anti-fuses, or other forms of circuits). For example, integrated circuit 100 may represent a programmable device such as a programmable clock or PLD (e.g., a field programmable gate array (FPGA) or a complex programmable logic device (CPLD)), with memory 214 representing a portion of programmable memory. Drivers 212 drive the signals provided from bypass multiplexers 210 to output terminals 124.

Circuit 200, with micro-skew circuits 208, may provide very fine delay element control (e.g., also referred to herein as micro-skew control) for integrated circuit 100 or other types of clock generator and buffer circuits (e.g., any type of integrated circuit). The fine delay may provide incremental delay steps that are much smaller than could be provided by conventional techniques. Furthermore, the delay technique illustrated in circuit 200 utilizes, for example, PLL bias to provide one or more delays, which are process/voltage/supply independent and programmable.

Figure 3:
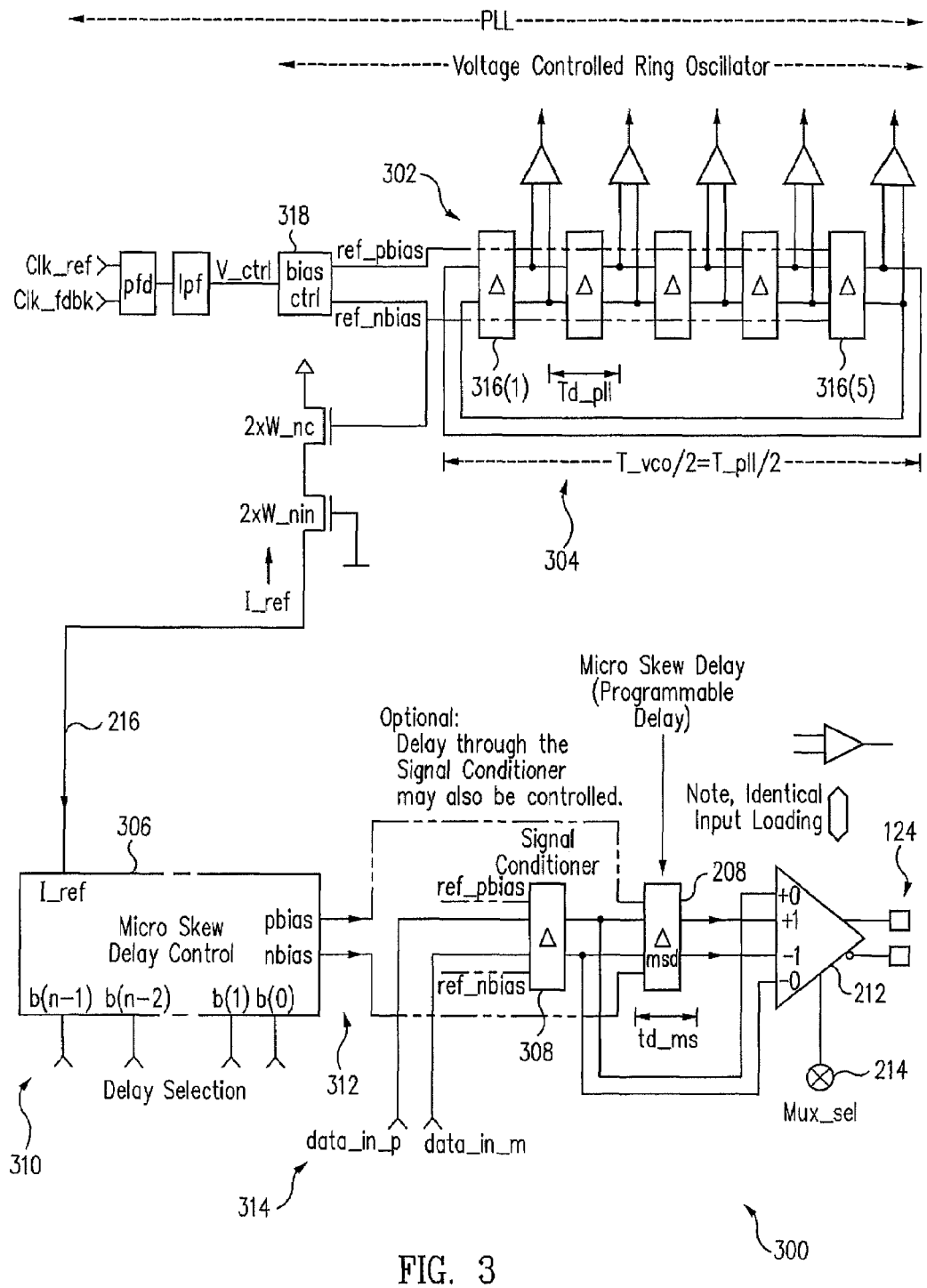
FIG. 3 shows a block diagram illustrating an exemplary circuit implementation for a portion of FIGS. 1 and 2 in accordance with an embodiment of the present invention.

FIG. 3 shows a circuit 300, which illustrates an exemplary circuit block diagram implementation for certain portions of integrated circuit 100 (FIG. 1) and circuit 200 (FIG. 2) in accordance with an embodiment of the present invention. Circuit 300 includes a PLL 302 receiving clock and feedback signals (labeled Clk_ref and Clk_fdbk) and providing VCO bias signal 216 to control logic 306 (labeled micro skew delay control).

In accordance with an embodiment of the present invention, VCO bias signal 216 represents a ref_nbias signal from bias control circuit 318, which provides the ref_nbias signal and a ref_pbias signal to control a voltage controlled ring oscillator 304 of PLL 302. It should also be understood that, depending upon the desired application or requirements, VCO bias signal 216 may be implemented to represent the ref_pbias signal, rather than the ref_nbias signal, or may represent the ref_nbias signal and the ref_pbias signal and provided to control logic 306. Alternatively in accordance with one or more embodiments, bias control circuit 318 may only provide a single ref_bias signal to provide bias control within PLL 302, with VCO bias signal 216 representing the single ref_bias signal as would be understood by one skilled in the art.

Voltage controlled ring oscillator 304 includes a number of delay elements 316 (e.g., five delay elements referenced as delay elements 316(1) through 316(5)), with PLL 302 representing an exemplary implementation for a portion of PLL 116 (FIG. 1). As a layout example, delay elements 316 may have a leap frog layout placement to match interconnect parasitic loading.

Control logic 306 (fine delay element control circuit, which represents an exemplary implementation for control logic 206 (FIG. 2)), receives VCO bias signal 216 and control signals 310 (labeled delay selection, which may be provided by memory 214 as discussed in reference to FIG. 2) and provides delay control signals in the form of micro-skew control signals 312 (labeled pbias and nbias) to micro-skew circuit 208 (e.g., representing one micro-skew circuit 208 for one channel for this example). Input signals 314 (labeled data_in_p and data_in_m), which for example represents the PLL output signal (e.g., the clock signal) provided by PLL 116 (FIG. 1) or the input signal provided to coarse/fine skew circuits 202 and bypass multiplexers 204 (FIG. 2), pass through an optional signal conditioner 308 before being provided to micro-skew circuit 208 and bypass multiplexer and driver 212.

Signal conditioner 308 functions generally to convert the fast rise times of input signals 314 into waveforms similar to those provided to voltage controlled ring oscillator 304 of PLL 302. Thus, a voltage signal swing (V_swing) at an output of micro-skew circuit 208 generally should be similar to that of PLL 302 so that the delay closely tracks PLL 302, as may be required for a desired application.

Signal conditioner 308 may optionally have a controllable delay and provided with bias signals (labeled ref_pbias and ref_nbias) from control logic 306. The delay through signal conditioner 308 does not need to be adjustable given that signal conditioner 308 is included in the delay path to output terminals 124. However, if the delay through signal conditioner 308 is adjusted along with micro-skew circuit 208, then the total incremental delay adjustment through signal conditioner 308 and micro-skew circuit 208 may be equal to the desired incremental delay.

In general, signal conditioner 308 and micro-skew circuit 208 (e.g., a fine delay element) may each be implemented with delay elements (e.g., slave delay elements) similar to delay elements 316 of voltage controlled ring oscillator 304 of PLL 302 (e.g., a master PLL or alternatively implemented as a master DLL), with circuit elements of micro-skew circuit 208 sized appropriately. Thus for example, by using a programmable slave set of delay elements (e.g., micro-skew delay represented by micro-skew circuit 208) based on the master PLL/DLL delay elements, a very fine control over delay may be achieved.

For example, the insertion delay for each of signal conditioner 308 and micro-skew circuit 208 may be approximately equal to one of delay elements 316. However, micro-skew circuit 208 may provide a much finer delay adjustment (e.g., much smaller incremental delay steps) than may be possible using delay elements 316 or signal conditioner 308.

Micro-skew circuit 208 may use various methods to linearly and accurately adjust the delay in fine steps, as discussed further herein. The overall micro-skew delay may not be significant compared to the total PLL adjustment range, but if the technique is used on one or more output channels (e.g. for output terminals 124), the fine delay adjustments may eliminate mismatch and propagation delay errors between the output channels or in the user system, leading to significant skew reductions and increased performance.

For example in accordance with one or more embodiments of the present invention, micro-skew circuits 208 (micro-skew delay elements) may use the same basic bias and control architectures as PLL 302 (e.g., provided to the PLL/DLL delay elements). Delay elements 316 are controlled by an accurate reference clock that may maintain a precise delay over process, voltage, and temperature and therefore, micro-skew circuits 208 (the slave delay elements) may have the same tight control over delay.

Furthermore for example, besides implementing appropriately scaled versions of the delay element for delay elements 316 of PLL 302 and micro-skew circuit 208, a similar layout (e.g., x-y orientation) along with similar unit-sized transistor elements for identical device and parasitic loading may help achieve delay matching. Additionally, bias circuitry used within control logic 306 may be similar to or a scaled version of bias circuitry within PLL 302 (e.g., similar bias circuitry as shown for example in FIGS. 4 and 6) to provide further delay matching and circuit correspondence.

Figure 4:
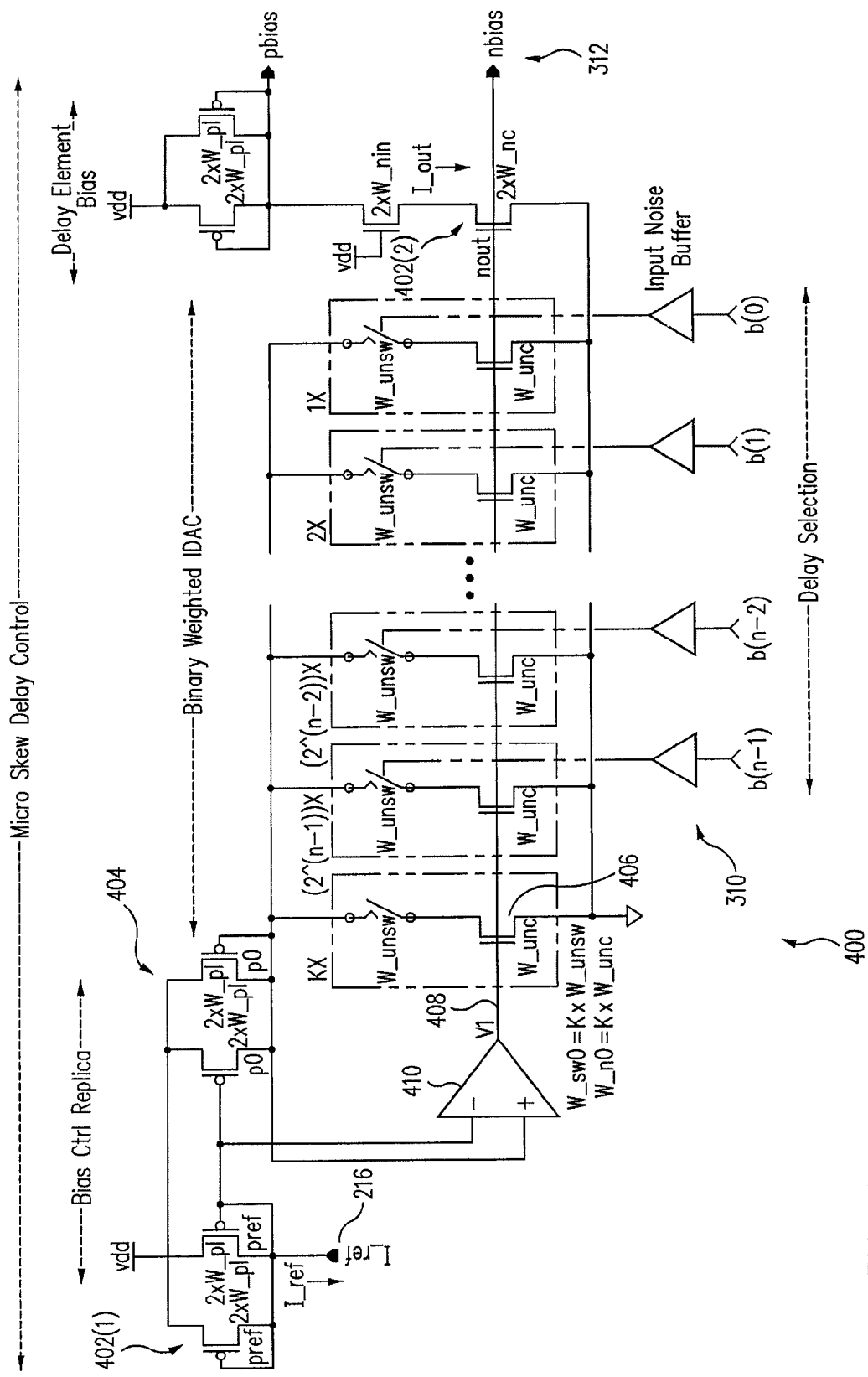
FIG. 4 shows a block diagram illustrating an exemplary circuit implementation for a portion of the circuit of FIG. 3 in accordance with an embodiment of the present invention.

FIG. 4 shows a circuit 400, which illustrates an exemplary circuit block diagram implementation for control logic 306 of FIG. 3 in accordance with an embodiment of the present invention. Circuit 400 receives VCO bias signal 216 and control signals 310 and provides micro-skew control signals 312 by employing a binary weighted current-controlled digital-to-analog converter (IDAC). As an example, the IDAC layout may be as a two-dimensional common centroid array.

The current flowing through transistors 404 (i.e., two p-channel transistors labeled p0) may be fixed and determined by bias control circuit 318 of PLL 302, which provides VCO bias signal 216. For example, the current flowing through transistors 404 may be equal to or a multiple of the current flowing through the corresponding transistors of bias control circuit 318 (e.g., as shown in FIG. 6). Thus, the current may be as required to cause the VCO frequency of PLL 302 to lock to a reference input clock (e.g., provided from reference signal terminals 114).

The value of control signals 310 (also referred to herein as the value of the "b" input) determine how much current will flow through a transistor 406 (e.g., an n-channel transistor whose size is W_n0). Transistor 406 is driven from a node 408 (labeled V1) of an amplifier 410 (IDAC operational amplifier). As the value of control signals 310 increases, the current flow ("I") through transistor 406 decreases, which causes a corresponding increase in delay through the micro-skew delay stage (i.e., one of micro-skew circuits 208 such as shown in FIG. 3) as set forth in the following equation.

$$T\_delay = \frac{C\_load \times V\_swing}{I}$$

Circuit 400 (micro-skew delay control circuit) may be trimmed, as desired for a given application. For example, transistors 402(1) and 402(2) are designated as a few of the transistors within circuit 400 where trimming may be utilized to cause the delay through the corresponding micro-skew circuit 208 to appropriately match the PLL delay stage (e.g., delay elements 316 within PLL 302). For example, this fine trim adjustment may be desired to compensate for insertion error caused by signal conditioner 308 and/or for other error sources, such as variations in the voltage swing (V_swing).

FIG. 5 shows a circuit 500, which illustrates a general exemplary circuit block diagram implementation for each of micro-skew circuit 208, signal conditioner 308, and/or delay element 316 of FIGS. 2 and 3 in accordance with an embodiment of the present invention. Specifically, circuit 500 shows an exemplary differential delay stage that receives control signals (e.g., pbias and nbias) and differential input signals (e.g., Vip and Vim) and provides differential output signals (Vom and Vop).

FIG. 6 shows a circuit 600, which illustrates an exemplary circuit block diagram implementation for bias control circuit 318 of FIG. 3 in accordance with an embodiment of the present invention. In general for FIGS. 3-6, the size of the transistors and various circuit elements are shown in an exemplary fashion (e.g., with labels such as W_nin, W_pl, W_nc, and W_sw0), but as one skilled in the art would understand, the size of these circuit elements will vary and scale to accomplish the particular design objectives, such as for power, area, and/or performance requirements.

FIG. 7 shows a graph illustrating simulated performance of micro-skew circuit 208 of FIG. 3 as controlled by circuit 400 (e.g., control logic 306) in accordance with an embodiment of the present invention. For the graph, Td_ms (time delay of micro-skew circuit 208 as shown in FIG. 3) is plotted versus b (value of control signals 310 to control logic 306), where these variables are as shown in the figures and as set forth in the following equations.

$$Td\_ms = \frac{C \times V\_swing}{I\_out}$$

$$b = \sum_{0}^{n-1} b(i)$$

$$I\_out = \frac{I\_ref \times W\_p0 \times w\_nout}{W\_pref \times (W\_n0 + (b \times W\_unc))}$$

The variable C represents the capacitive load on the output of micro-skew circuit 208, with circuit elements within the figures (e.g., FIG. 4) referenced by their labels in the equations. For relative sizes shown in the figures, the following equation may govern for Td_ms, with minimum and maximum time delays given also below, where Td_pll is the time delay for one of delay elements 316 (as shown in FIG. 3).

$$Td\_ms = Td\_pll \times \left(1 + \frac{b}{2^n}\right)$$

$$Td\_ms(min) = Td\_pll$$

$$Td\_ms(max) = Td\_pll \times \left(1 + \frac{2^n - 1}{2^n}\right)$$

Systems and methods are disclosed herein to provide improved clock, delay, and skew techniques. For example, in accordance with an embodiment of the present invention, a method is disclosed for selecting fine and precise time delay shifts for controlling digital clock signals for DLL and PLL-based clock generators, synthesizers, buffers, and other types of circuits requiring clock signals.

The micro-skew delay may provide a fine and precise control of clock signal delays, with the micro-skew delay elements based on the master PLL/DLL delay elements to provide accurate control of the delay variation of the micro-skew delay over process, voltage, and temperature as compared to conventional methods. The micro-skew circuit and control logic provides fine-tuning control of the delay in the micro-skew delay, with a substantially linear fine delay provided for the micro-skew delay. The micro-skew delay may be controlled by control signals, the values of which may be programmed into memory and may be reprogrammable to adjust delay settings.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A clock skew control circuit for an integrated circuit comprising:
    a course skew circuit adapted to receive a clock signal from a clock generator and provide the clock signal with a first delay;
    a first multiplexer adapted to select the clock signal from the clock generator or the delayed clock signal from the coarse skew circuit to provide as the clock signal;
    a fine skew circuit adapted to receive the clock signal from the first multiplexer and provide the clock signal with a second delay, wherein the delay provided by the fine skew circuit is based at least in part on a bias signal provided by the clock generator;
    a second multiplexer adapted to select between the clock signal from the first multiplexer and the delayed clock signal from the fine skew circuit, and
    memory coupled to the first and second multiplexers for providing control signals that control clock signal selection by the multiplexers.

2. The clock skew control circuit of claim 1, wherein the memory is non-volatile memory.

3. The clock skew control circuit of claim 1, wherein the integrated circuit includes the clock generator.

4. The clock skew circuit of claim 3, wherein the clock generator includes a phase-locked loop.

5. The clock skew control circuit of claim 1 including a current-controlled digital-to-analog converter adapted to receive the bias signal and digital control signals and provide a current-based delay control signal to the fine skew circuit to determine the delay provided by the fine skew circuit.

6. The clock skew control circuit of claim 5 including memory coupled to the current-controlled digital-to-analog converter for providing the digital control signals.

7. An integrated circuit comprising:
    a clock generator adapted to provide a bias signal and a clock signal;
    a coarse skew circuit adapted to receive the clock signal from the clock generator and provide the clock signal with a first delay;
    a first multiplexer adapted to select the clock signal from the clock generator or the delayed clock signal from the coarse skew circuit to provide as the clock signal;
    a current-controlled digital to analog converter adapted to receive the bias signal and a digital control signal and provide a current-based delay control signal;
    a fine skew circuit adapted to provide a second delay to the clock signal received from the multiplexer based on the bias signal and the current-based delay control signal provided by the digital-to-analog converter; and
    memory coupled to the current-controlled digital-to-analog converter for providing the digital control signal.

8. The integrated circuit of claim 7 including a second multiplexer adapted to select between the clock signal received from the first multiplexer and the delayed clock signal from the fine skew circuit.

9. The integrated circuit of claim 7, wherein the clock generator is a phase-locked loop and the bias signal is a VCO bias signal.

10. An integrated circuit comprising:
    a clock generator adapted to provide a bias signal and a clock signal;
    control logic adapted to receive the bias signal and a multi-bit control signal and provide a delay control signal based on the bias signal and multi-bit control signal;
    a course skew circuit adapted to receive a clock signal from a clock generator and provide the clock signal with a first delay;
    a first multiplexer adapted to select the clock signal from the clock generator or the delayed clock signal from the coarse skew circuit to provide as the clock signal;
    a fine skew circuit adapted to provide a second delay to the clock signal selected by the multiplexer, the delay based on the delay control signal provided by the control logic; and
    memory coupled to the control logic for providing the multi-bit control signal.

11. The integrated circuit of claim 10 including a second multiplexer adapted to select between the clock signal from the first multiplexer and the delayed clock signal from the fine skew circuit.

12. The integrated circuit of claim 10, wherein the control logic includes a digital-to-analog converter adapted to receive the bias signal and digital control signals and provide a current-based delay control signal to the fine skew circuit to determine the delay provided by the fine skew circuit.

13. The integrated circuit of claim of claim 12 including memory coupled to the digital-to-analog converter for providing the digital control signals.

14. The integrated circuit of claim 10, wherein the clock generator is a phase-locked loop and the bias signal is a VCO bias signal.

* * * * *